(12) United States Patent
Cocciadiferro

(10) Patent No.: US 9,138,921 B2
(45) Date of Patent: Sep. 22, 2015

(54) FOAM-IN-BAG APPARATUS WITH POWER-FAILURE PROTECTION

(75) Inventor: Edward Cocciadiferro, Fletcher, NC (US)

(73) Assignee: PREGIS INTELLIPACK LLC, Deerfield, IL (US)

( * ) Notice: Subject to any disclaimer, the term of this patent is extended or adjusted under 35 U.S.C. 154(b) by 892 days.

(21) Appl. No.: 13/223,096

(22) Filed: Aug. 31, 2011

(65) Prior Publication Data

US 2013/0047552 A1   Feb. 28, 2013

(51) Int. Cl.
| | |
|---|---|
| B65B 43/06 | (2006.01) |
| B65B 47/08 | (2006.01) |
| B29C 44/18 | (2006.01) |
| B31D 5/00 | (2006.01) |
| H02J 9/06 | (2006.01) |
| B29K 275/00 | (2006.01) |

(52) U.S. Cl.
CPC ............ *B29C 44/182* (2013.01); *B31D 5/0078* (2013.01); *H02J 9/06* (2013.01); *B29K 2275/00* (2013.01); *B31D 2205/0094* (2013.01); *Y10T 137/0318* (2015.04)

(58) Field of Classification Search
CPC ........................................................ B65B 1/30
USPC .............................................. 53/77, 452, 548
See application file for complete search history.

(56) References Cited

U.S. PATENT DOCUMENTS

| | | | |
|---|---|---|---|
| 4,999,975 A * | 3/1991 | Willden et al. ................. 53/451 |
| 5,018,148 A * | 5/1991 | Patel et al. ....................... 714/22 |
| 5,151,907 A * | 9/1992 | Robbins ........................... 714/22 |
| 5,186,905 A | 2/1993 | Bertram et al. |
| 5,699,902 A | 12/1997 | Sperry et al. |
| 5,791,522 A | 8/1998 | Lee et al. |
| 5,950,875 A | 9/1999 | Lee et al. |
| 6,131,375 A | 10/2000 | Sperry |
| 6,283,174 B1 | 9/2001 | Sperry et al. |
| 6,289,649 B1 | 9/2001 | Cherfane |
| 6,460,567 B1 | 10/2002 | Hansen, III |
| 6,675,557 B2 | 1/2004 | Sperry et al. |
| 6,811,059 B2 | 11/2004 | Piucci, Jr. et al. |
| 6,820,835 B2 | 11/2004 | Cavaliere et al. |

(Continued)

FOREIGN PATENT DOCUMENTS

EP          0793042 A1       9/1997

OTHER PUBLICATIONS

Prosecution Document: PCT International Search Report, for PCT/US2012/052486, Dec. 20, 2012, 5 pages.

*Primary Examiner* — Nathaniel Chukwurah
(74) *Attorney, Agent, or Firm* — Dorsey & Whitney LLP

(57) ABSTRACT

Exemplary embodiments of the present disclosure can provide a foam-in-bag device. The device can include a dispenser unit configured for dispensing a fluid foam-precursor into a web of film material for making foam-in-bag packaging material, a fluid supply conduit connected to the dispenser unit for delivering the foam-precursor to the dispenser unit, a valve connected to the dispenser outlet and that is actuatable between: an open condition allowing flow of the foam-precursor so as to permit the dispensing of the foam precursor, and a closed condition preventing flow of the-foam precursor so as to prevent the dispensing of the foam precursor. The device can further include a power-loss protection mechanism configured to direct auxiliary power to actuate the valve to the closed condition upon a loss of incoming power.

26 Claims, 16 Drawing Sheets

(56) References Cited

U.S. PATENT DOCUMENTS

| | | |
|---|---|---|
| 6,996,956 B2 | 2/2006 | Sperry et al. |
| 7,160,096 B2 | 1/2007 | Knaak et al. |
| 7,328,541 B2 | 2/2008 | Garceau et al. |
| 7,341,632 B2 * | 3/2008 | Noble .......................... 118/317 |
| 7,386,969 B2 * | 6/2008 | Hayduk .......................... 53/459 |
| 7,429,304 B2 | 9/2008 | McNamara, Jr. et al. |
| 7,490,737 B2 * | 2/2009 | Cocciadiferro et al. ... 222/145.5 |
| 7,603,831 B2 | 10/2009 | Sperry et al. |
| 7,959,103 B2 * | 6/2011 | Cocciadiferro et al. ...... 242/597 |
| 2004/0104244 A1 * | 6/2004 | Cline et al. ...................... 222/63 |
| 2009/0038270 A1 | 2/2009 | Mahon et al. |
| 2009/0056286 A1 * | 3/2009 | Bertram et al. ................. 53/505 |

\* cited by examiner

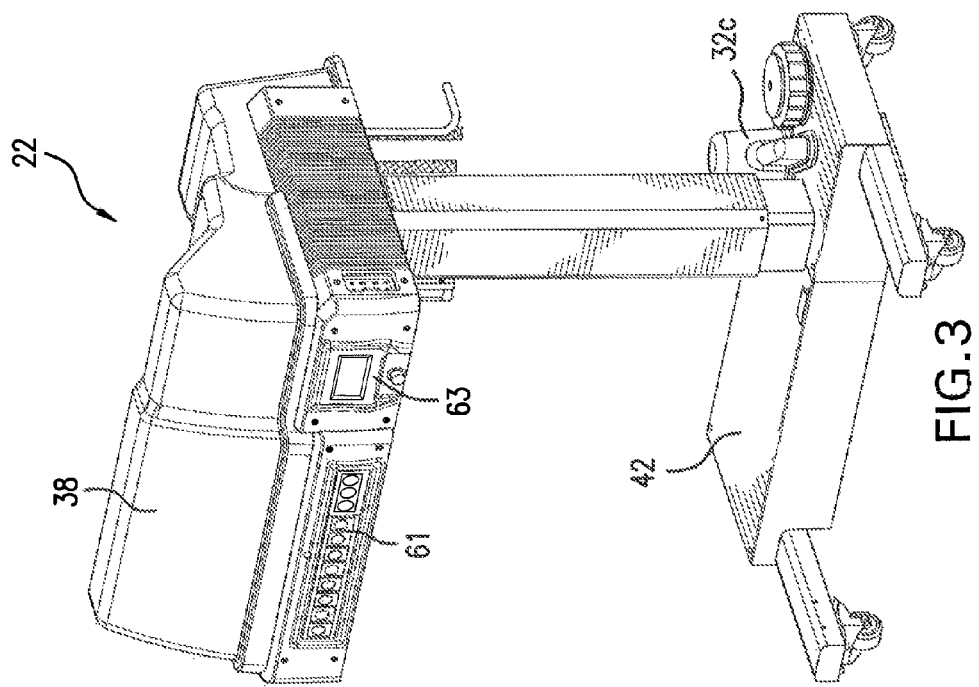
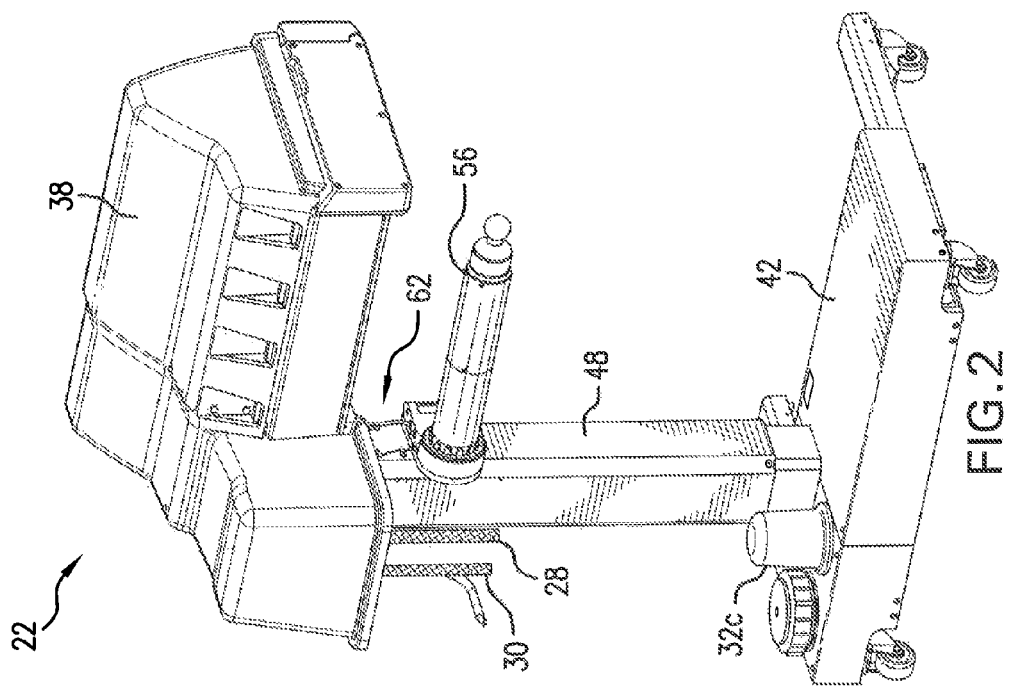

FOAM-IN-BAG APPARATUS WITH POWER-FAILURE PROTECTION

FIELD OF THE DISCLOSURE

The present disclosure relates to dispensing systems and apparatuses, and in particular to foam-in-bag devices and a power failure protection arrangement and method.

BACKGROUND INFORMATION

Foam material dispensers have been developed including those directed at dispensing polyurethane foam precursor that are mixed together to form a polymeric product. The chemicals are often selected so that they harden following a generation of carbon dioxide and water vapor, and they have been used to form "hardened" (e.g., a cushioning quality in a proper fully expanded state) polymer foams in which the mechanical foaming action is caused by the gaseous carbon dioxide and water vapor leaving the mixture.

In particular techniques, synthetic foams such as polyurethane foam are formed from liquid organic resins and polyisocyanates in a mixing chamber (e.g., a liquid form of isocyanate, which is often referenced in the industry as chemical "A", and a multi-component liquid blend called polyurethane resin, which is often referenced in the industry as chemical "B"). The chemicals are typically mixed in a mixing module, and the mixture can be dispensed into a receptacle, such as a package or a foam-in-place bag, where it reacts to form a polyurethane foam.

A typical mixing module includes inlet ports that introduce the various chemicals into the mixing module in producing the foam. Flow of the compounds from the inlet ports into the mixing module is generally controlled by a valve that can be actuated between open and closed positions. However, foam-in-bag machines typically do not include mechanisms designed to prevent the flow of the chemicals in the event of a power loss. For example, if the valve of a mixing module is in an open position (e.g., in a position where the chemicals are flowing so that the foam-in-bag machine is producing and dispense foam) when the machine loses electrical power, the valve of the mixing module would remain in this open position. Accordingly, the chemicals would continue to flow even after the machine has lost power, and the operator would be without means to stop the flowing chemicals and the foam. The uncontrolled flowing of chemicals and foam can cause the foam to overflow, and this can lead to a foam and chemical mess inside the machine, on the floor of the facility, and on the product that the operator was attempting to pack. It can also lead to a crossover of chemicals, as one chemical can migrate into the opposite side of the dispenser or vice versa.

Power losses that can lead to such a situation can be experienced for a variety of reasons. For example, the entire facility could lose power (e.g., a blackout, tripped breaker, etc.), the operator can initiate a shutdown (e.g., emergency shut down, etc.), a colleague can unexpectedly shut off the power (e.g., a practical joke, an emergency shut down, etc.), the power can be shut off accidentally (e.g., accidental removal of the plug, accidental initiation of shut down, etc.), or the like. Such a situation can require a protracted service call from a qualified technician to clean the mess and service the machine for running again. In addition to the costs of the service call, additional expenses may be required if parts need to be replaced. Further, expanded and hardened foam produced by the foam-in-bag machine can be tough to remove. Furthermore, these sorts of events can damage the operator's confidence in the foam-in-bag process, and may cause operator to search for alternative packaging materials and solutions.

SUMMARY

Exemplary embodiments of the present disclosure are directed to a foam-in-bag device. For example, exemplary embodiments of the present disclosure can provide a foam-in-bag device including a dispenser unit configured for dispensing a fluid foam-precursor into a web of film material for making foam-in-bag packaging material, a fluid supply conduit connected to the dispenser unit for delivering the foam-precursor to the dispenser unit, a valve that is connected to the dispenser outlet and that is actuatable between: an open condition allowing flow of the foam-precursor so as to permit the dispensing of the foam precursor, and a closed condition preventing flow of the-foam precursor so as to prevent the dispensing of the foam precursor. The device can further include a power-loss protection mechanism configured to direct auxiliary power to actuate the valve to the closed condition upon a loss of incoming power. The power-loss protection mechanism can be connected for detecting the loss of incoming power and directing the auxiliary power to the valve when the loss of incoming power is detected. Further, the auxiliary power may only be sufficient for powering the valve for less than about 10 seconds. The power-loss protection mechanism can include a power-loss detection arrangement configured to detect the loss of incoming power and generate a power failure signal and a power-loss processing arrangement configured to process the power failure signal. According to certain exemplary embodiments, the power-loss processing arrangement can include a field programmable gate array, and the valve can include a valving rod.

According to certain exemplary embodiments, the auxiliary power can be supplied by a first power supply. The auxiliary power can include residual power from the first power supply after the loss of incoming power. Further, the first power supply can include at least one capacitor and the residual power can include power stored on the capacitor.

The device can further include an auxiliary power supply, and the auxiliary power can be supplied by the auxiliary power supply, which can, for example, include a battery. The device can include a valve actuation arrangement operably associated with the valve for actuating the valve between the open and closed conditions, the valve actuation arrangement including a sensor configured to detect a position of the valve for controlling the actuation for closing the valve when the power loss is detected. The actuation arrangement can also include a motor.

According to other embodiments, the foam precursor can include first and second foam precursors selected for reacting together to produce a foam that expands and solidifies for the foam-in-bag protective packaging, and wherein the dispenser unit comprises a mixing module configured for mixing and dispensing the foam precursors. Further, in the closed condition, the valve can prevent the flow of the first and second foam precursors from the dispenser unit.

Another exemplary embodiment of the present disclosure can provide a method for preventing dispensing of a foam precursor in a foam-in-bag device. The method can include detecting a loss of incoming power, and directing auxiliary power to actuate a valve to a closed condition when the loss of incoming power is detected to prevent the dispensing of the foam precursor. The method can further include generating a power failure signal when the loss of incoming power is detected, processing the power failure signal to effectuate direction of the auxiliary power to actuate the valve, and detecting a position of the valve prior to directing the auxiliary power to actuate the valve. The processing can be at least partially performed by a field programmable gate array In some embodiments, the auxiliary power can be supplied by a first power supply. The auxiliary power can include residual power from the normal-operation power supply after the power loss. Further, the first power supply can include at least one capacitor and the residual power can include power stored on the capacitor. According to other exemplary embodiments, the auxiliary power can be supplied by an auxiliary power supply to actuate the valve to the closed condition.

While multiple embodiments are disclosed, still other embodiments in accordance with the present disclosure will become apparent to those skilled in the art from the following detailed description, which shows and describes illustrative embodiments. As will be realized, the disclosed embodiments are capable of modifications in various aspects, all without departing from the spirit and scope of thereof. Accordingly, the drawings and detailed description are to be regarded as illustrative in nature and not restrictive.

BRIEF DESCRIPTION OF THE DRAWINGS

Further objects, features, and advantages of the present disclosure will be apparent from the following detailed description taken in conjunction with the accompanying Figures showing illustrative embodiments of the present disclosure, in which:

FIGS. 2 and 3 illustrate a rear and front view, respectively of a dispenser system of the dispensing system as in FIG. 1;

Figure 1:
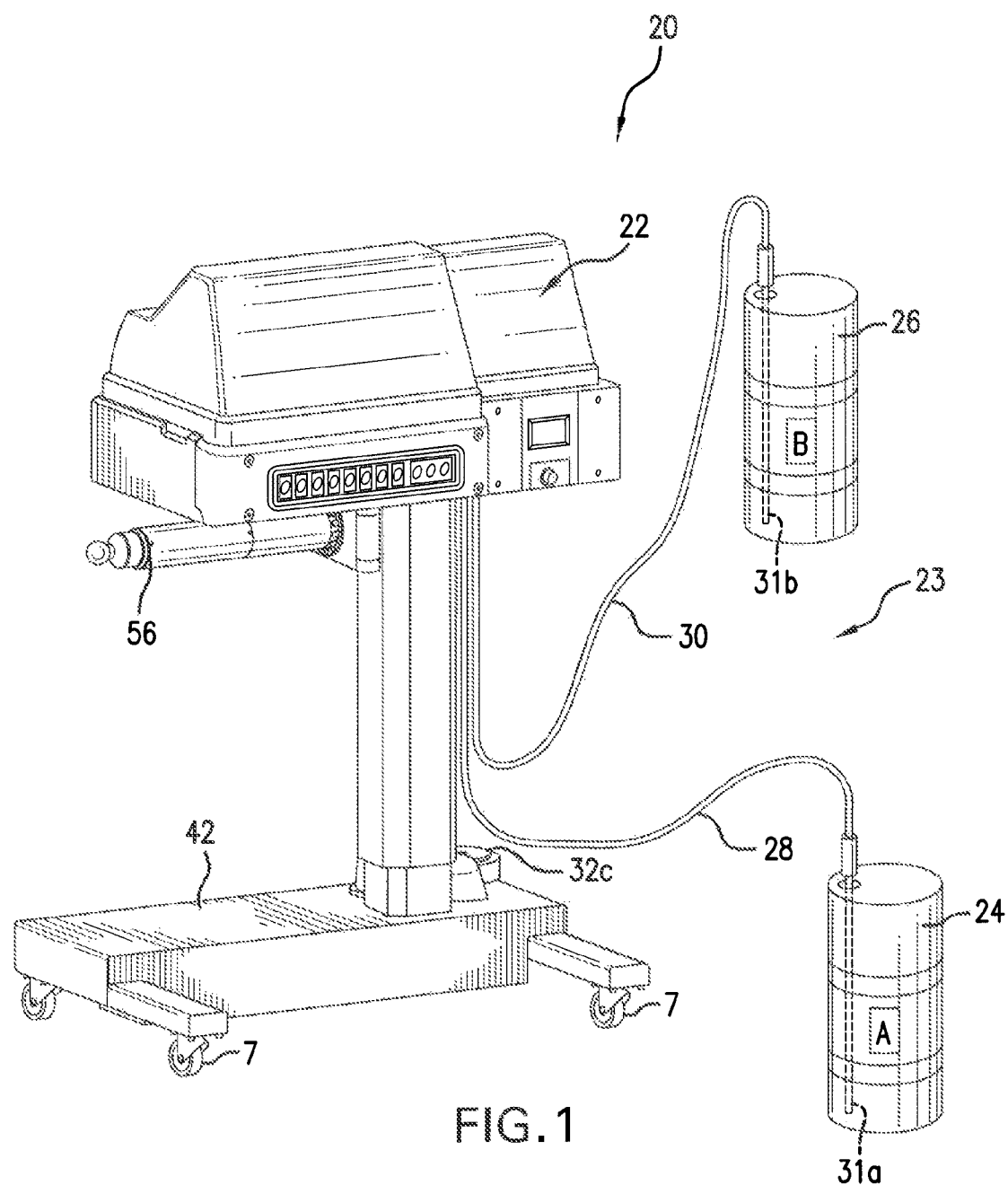
FIG. 1 illustrates an embodiment of the dispensing system of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures.

DETAILED DESCRIPTION OF EXEMPLARY EMBODIMENTS

With general reference to FIGS. 1-4, the present disclosure is directed to a dispensing system and components therefore. In particular, the present disclosure a foam-in-bag dispensing apparatus 20 used to produce foam-filled bags, and components having application in the foam-in-bag apparatus. Specific aspects of the apparatus 20 are discussed as follows.

FIG. 1 illustrates a preferred embodiment of the dispensing system 20 of the present disclosure, which includes dispenser system 22 in communication with the chemical supply system 23, itself including chemical supply container 24 (supplying chemical component A) and chemical supply container 26 (supplying chemical component B). Chemical hoses 28 (chemical A) and 30 (chemical B), in connection with tubes 31a, 31b (extending into the containers 24,26), provide fluid communication between respective chemical supply containers 24, 26 and in-line pumps 32a, 32b mounted on dispenser system 22 (see FIG. 11). Dispenser system 22 can include in-line pumps 32a, 32b that is in communication with chemical supply containers that are either in proximity (for example, 40 feet or less) to the dispenser system 22 or remote (for example, greater than 40 feet) from where the dispenser system 22 is located. This allows the containers to be situated in a more convenient or less busy area of a plant or other facility wherein the dispensing apparatus 20 is employed, as it is often not practical to store chemicals in close proximity to the dispenser system 22 (for example, 100 to 500 feet separation of dispenser system 22 and chemicals 24, 26 may be desirable in some applications). Thus, it is inherent in the present disclosure that a great deal of versatility as to how the dispenser system is to be set up relative to the chemical source is possible. As a number of installations require that the containers be stored hundreds of feet (for example, 100 to 500 feet or more) away from the system. In another embodiment, where the distance between the containers 24, 26 is shorter, e.g., about 20 feet to about 40 feet, tubes 31a, 31b may be replaced by pumps in containers 24, 26. The pumps 32a, 32b feed chemicals A and B to the system 22 via hoses 28, 30. It will be appreciated that in any embodiment, the chemicals A and B may be fed to the system 22 at its base, at the head, or at any other position of the system 22. The present disclosure is designed to accommodate these long, or short, length installation requirements, as may be present in any particular application.

FIGS. 2 and 3 provide rear and front elevational views, respectively, of dispenser system 22 which includes exterior housing 38 supported on telescoping support assembly 40, which in a preferred embodiment includes a lifter (for example, an electric motor driven gear and rack system with inner and outer telescoping sleeves or a screw mechanism) and is mounted on base 42 (for example, a roller platform base to provide some degree of mobility). Further mounted on base 42 is solvent pump system 32c (shown covered) configured to deliver a solvent cleaning solution from a solvent tank, through the assembly 40, and into the chemical dispenser apparatus (discussed in greater detail below) where such solvent is used to clean the tip of the mixing module (also discussed in greater detail below). Film roll reception assembly 56 preferably extends out from support assembly 48. FIG. 3 further provides a view of first and second control panels 61, 63.

Figure 4:
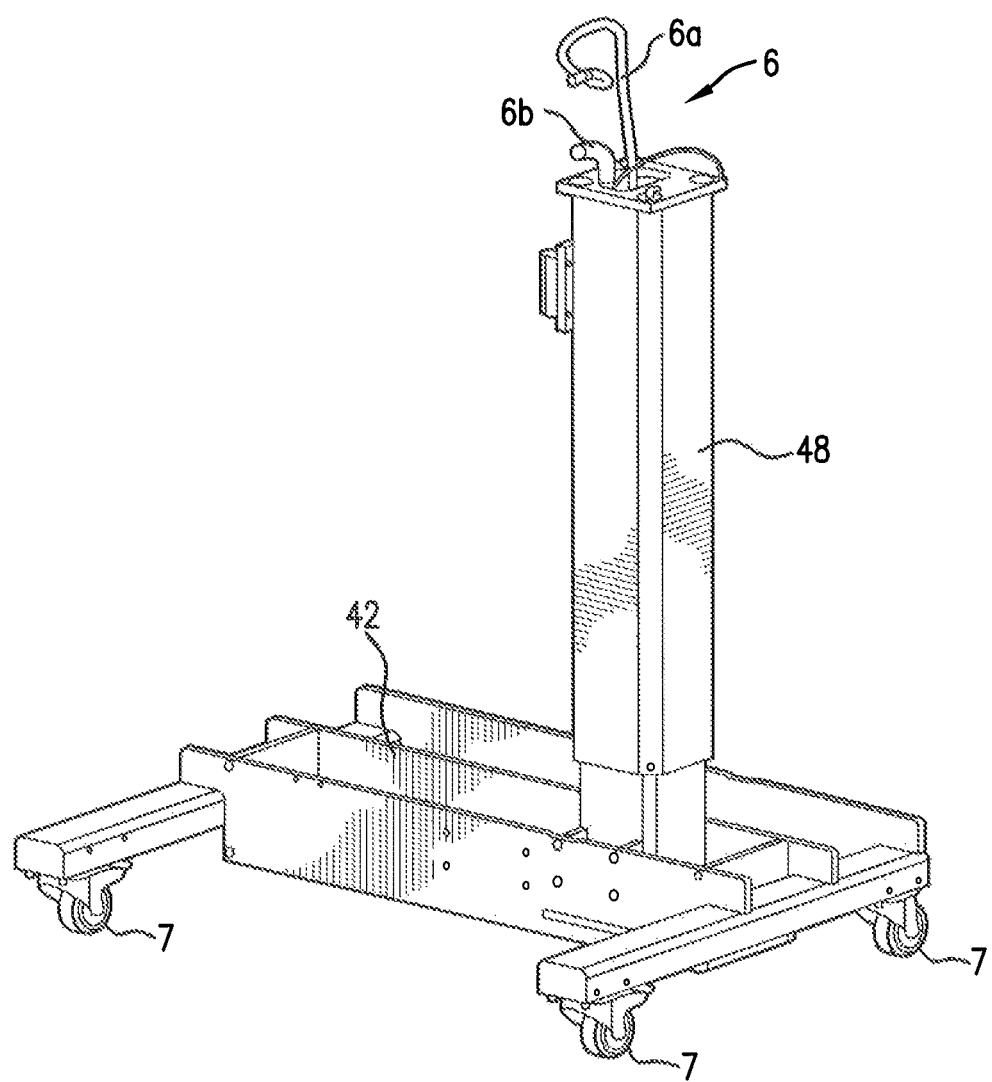
FIG. 4 illustrates a base and extendable support assembly of the dispenser system.

FIG. 4 illustrates base 42 and lifter or extendable support assembly 48 (e.g., preferably a hydraulic (air pressure) or gear/rack combination or some other telescoping or slide lift arrangement or a screw mechanism) extending up from base 42. FIG. 4 also illustrates the mobile nature of base 42 which is a wheeled assembly (wheels 7). Further shown are the connection assembly 6, including a solvent line 6a and electrical connectors 6b.

FIGS. 5-8 generally show aspects of a foam-in-bag assembly or "bagger assembly" of the present embodiment. The assembly includes frame sections 71, 73 which form a unitary flip door frame, and may be made of extruded aluminum. A rod 70 is fixed to the flip door frame sections 71, 73 and pivots in a hole in plate 66. Driver roller shaft 72, supporting left and right driven or follower nip rollers 74, 76. While in a latched state, the upper ends of frame sections 71, 73 are also supported (locked in closed position) by door latch rod 85 with handle latch 87.

Drive shaft 82 supports drive nip rollers 84, 86. Driven roller shaft 72 and driver roller shaft 82 are in parallel relationship and spaced apart so as to place the driven nip rollers 74, 76, and drive nip rollers 84, 86 in a film drive relationship with a preferred embodiment featuring a motor driven drive roller set 84, 86, driven by motor 80a, formed of a compressible, high friction material such as an elastomeric material (for example, a synthetic rubber) and the opposite, driven roller 74, 76 is preferably formed of a knurled aluminum nip roller set (although alternate arrangement are also featured as in both sets being formed of a compressible material like rubber). In some embodiments, shaft 72 and rollers 74, 76 may be of unitary construction.

Figure 7:
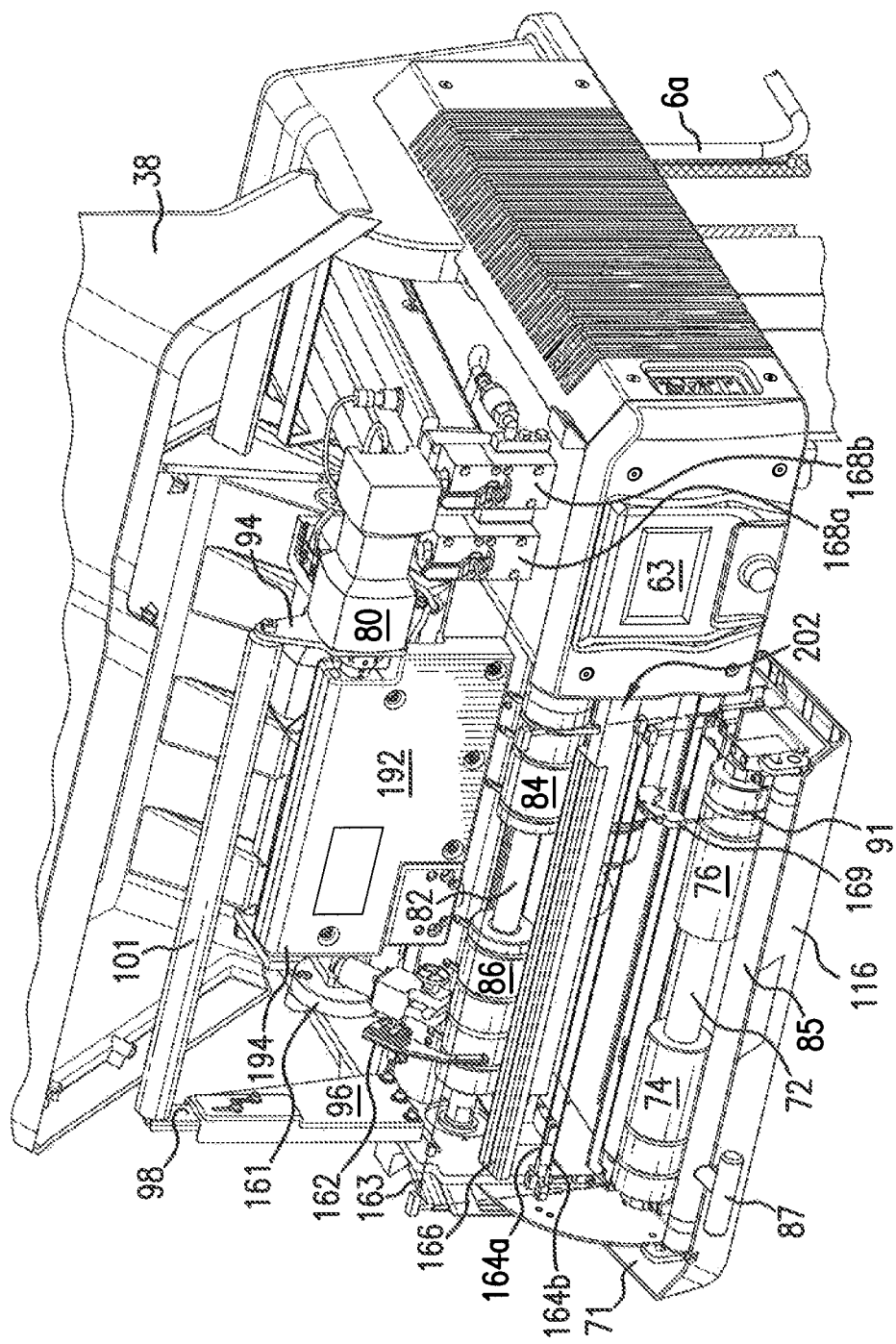

Drive nip rollers 84, 86 have slots formed for receiving film wrapping preventing means 90 (for example, canes 90). For example, canes 90 may be employed to prevent the film web from wrapping around the nip rollers 84, 86. FIG. 7 further illustrates bag film edge sealer 169 shown received within a slot 91 in roller 76 and positioned to provide edge sealing to a preferred C-fold film supply. Support portions 94 and 96 extend upward from the nip roller contact location. Support portion 94 supports the dispenser apparatus 92. Support portion 96 includes an upper portion 98 that includes a means for receiving an end of upper idler roller 101. The other end of the idler roller 101 is supported by support portion 100.

Idler roller 101 can preferably be adjusted to accommodate any roller assembly position deviation that can lead to non-proper tracking and also can be used to avoid wrinkled or non-smooth bag film contact. Also, idler roller 101 is preferably a steel or metal roller and not a plastic roller to avoid static charge build up relative to the preferred plastic film supplied. Idler roller is also preferably of the type having roller bearings positioned at its ends (not shown) for smooth performance and smooth, unwrinkled film feed.

Figure 5:
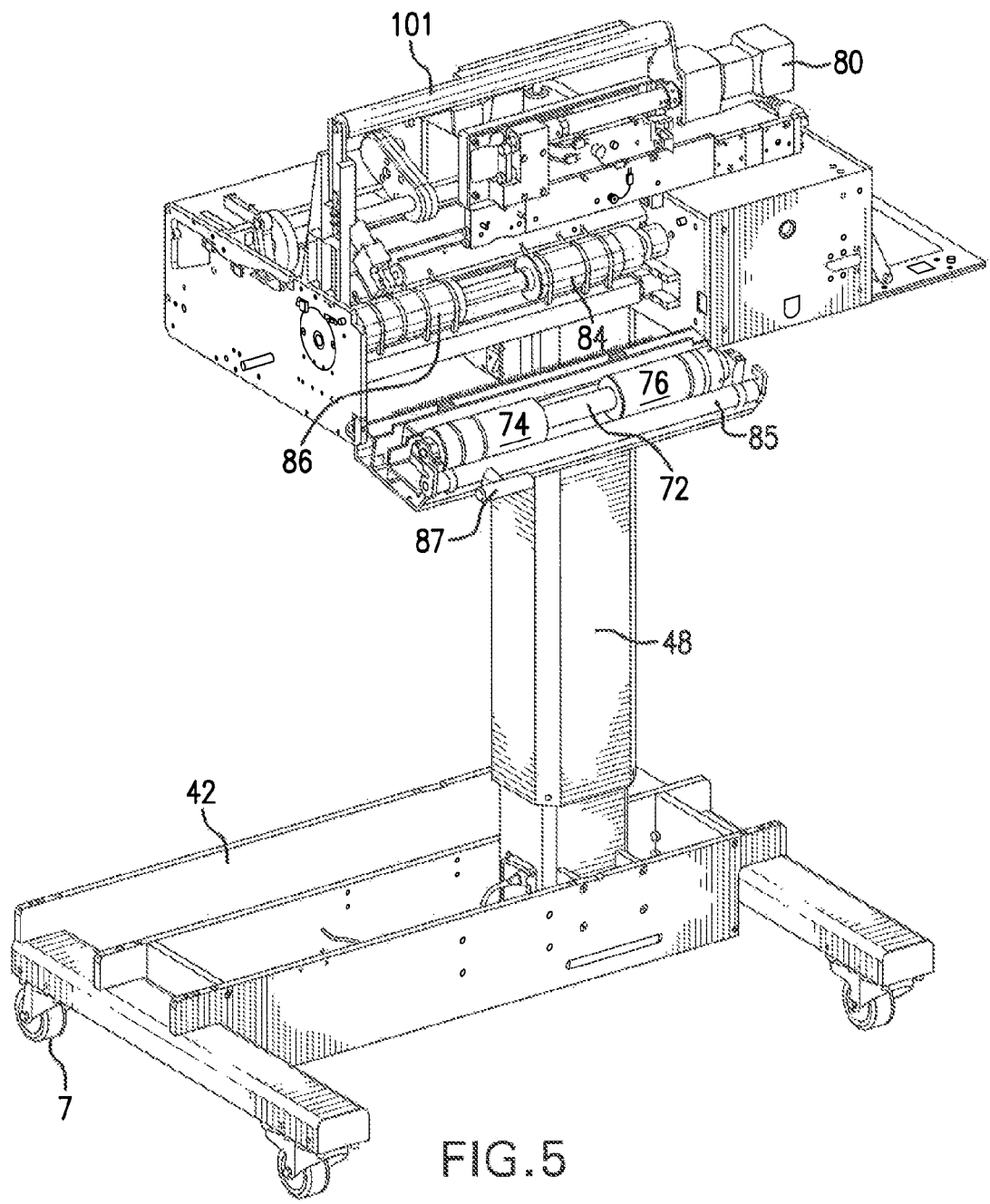
FIGS. 5-8 illustrate front perspective views of a bag forming assembly of the dispenser system of the present disclosure.
Figure 6:
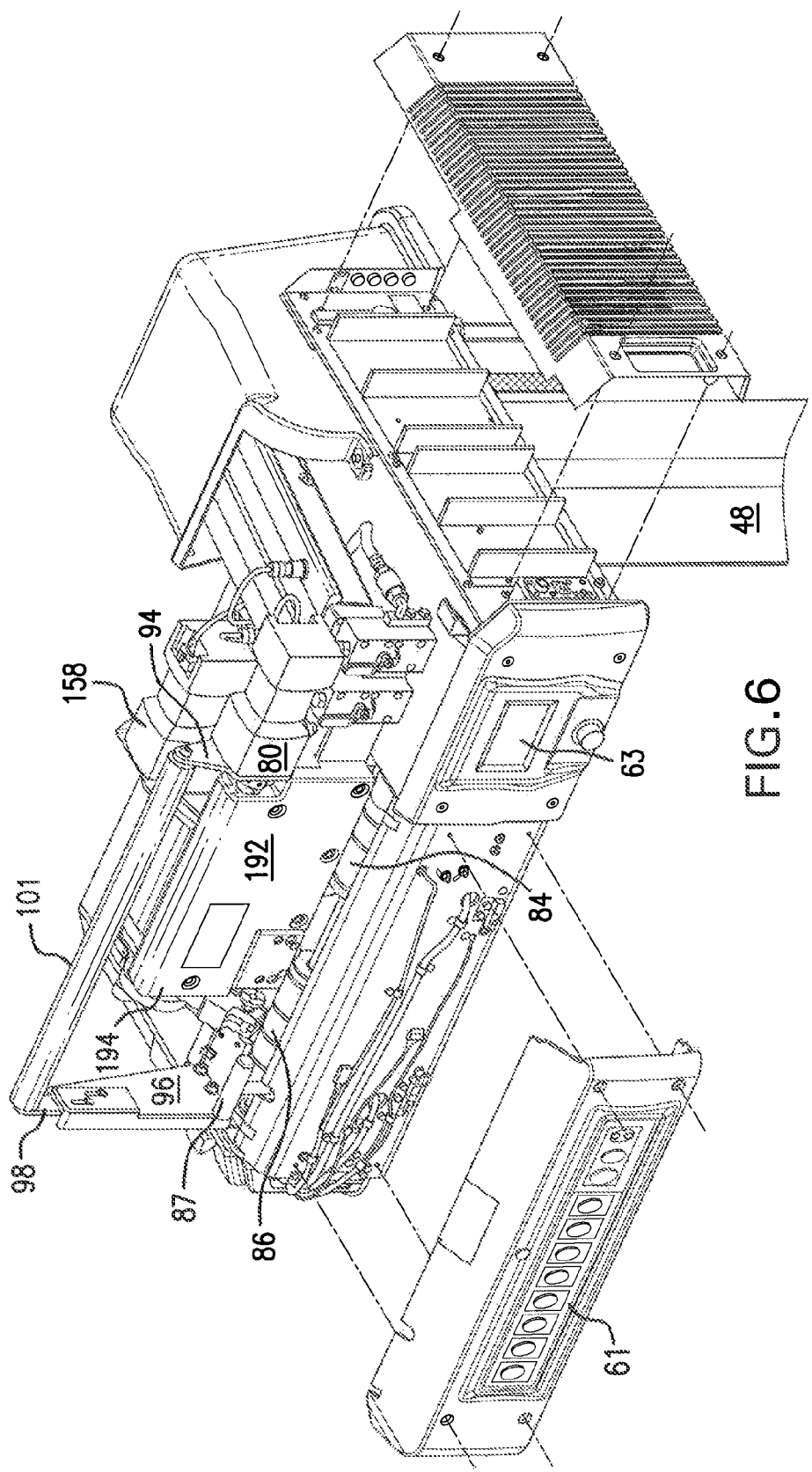

Also, FIGS. 5-8 show first (preferably being releasably lockable in an operative position) end or cross-cut/seal support block or cut/seal jaw 116 positioned forward of a vertical plane passing through the nip roller contact location and below the axis of rotation of drive shaft 82. End cut/seal jaw 116, which preferably is operationally fixed in position, in this embodiment has extruded aluminum construction (and is part of the flip door frame) of a sufficiently high strength so that it is not easily deformed over an extended length, and that is of sufficient heat resistance to withstand heat from the heated sealing and cutting elements (for example, a steel block with a zinc and/or chrome exterior plating), and preferably extends between left and right frame structures 66, and 68, but again, like driven shaft 72 and rollers 74, 76. The cut/seal jaw 116 is preferably supported on pivot frame sections 71, 73 and extends parallel with driven shaft 72. In some embodiments, the cut/seal jaw 116 may be of unitary construction with the sections 71, 73. FIG. 5 illustrates block 116 rigidly fixed at its ends to the opposing, interior sides of pivot frame sections 71, and 73 for movement therewith when latch (handle 87 of the latch is shown) is released. The sealing jaw 116 includes an actuator 161. Cut seal jaw operates with complementary jaw 116b, driven by motor 158 along track 117, to hold the film web in place during operation. In one embodiment, a crank is employed to drive the jaw 116b. In other embodiments, a solenoid or other means may be employed. Further disclosed is a vent cutter 162 for venting the bags, cutting wire 163 for cutting the bags, sealing wires 164a and 164b, and longitudinal sealing wires 169. The cutting and sealing wires are heated, with the heat transmitted by the cutting wire 163 to the film being greater than that of the sealing wires 163a, 163b. A PTFE (Teflon) film 166 can be used over the sealing wires 163a decrease the heat transmitted to the film compared to from the cutting wire 163.

Figure 8:
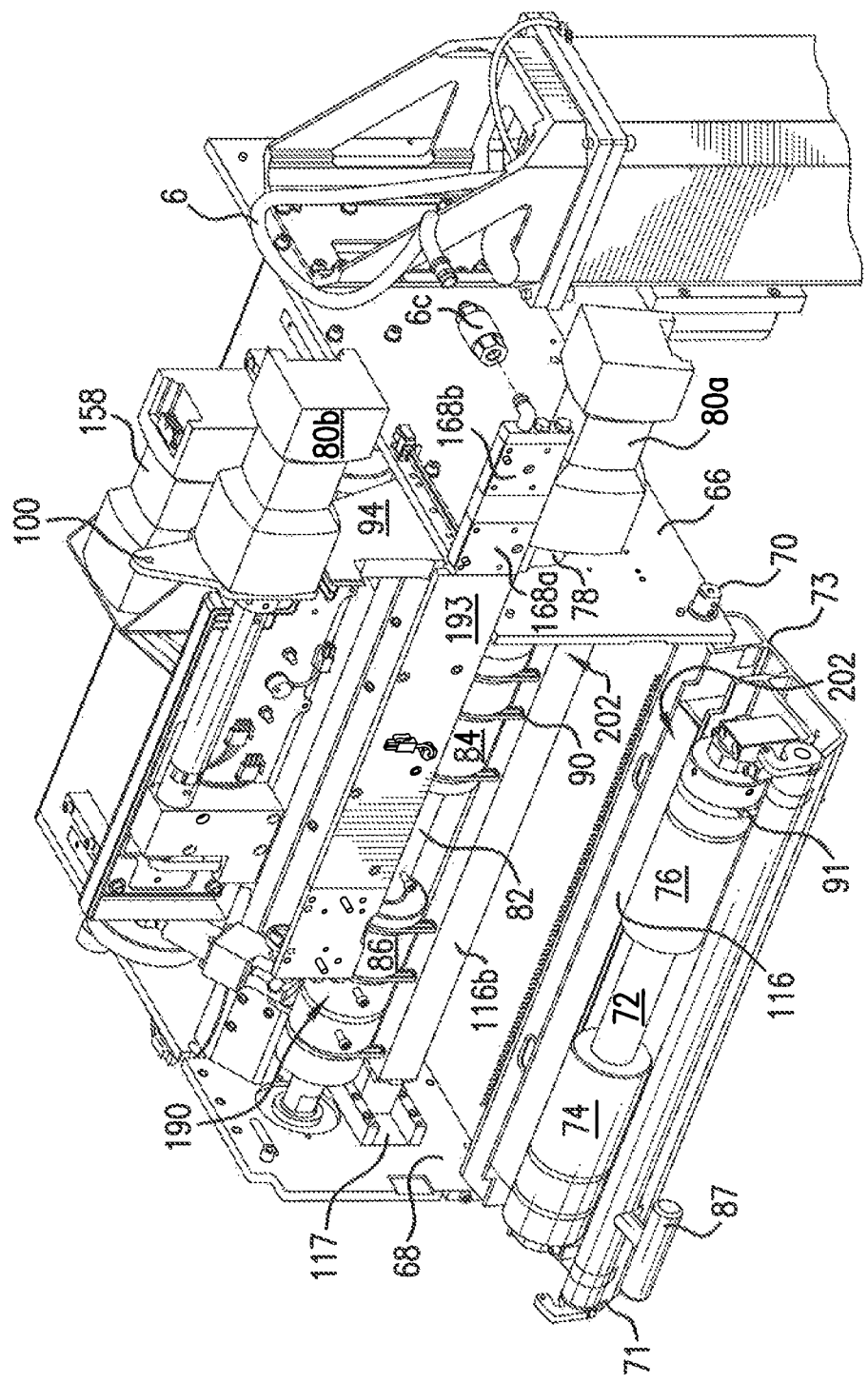
Figure 9:
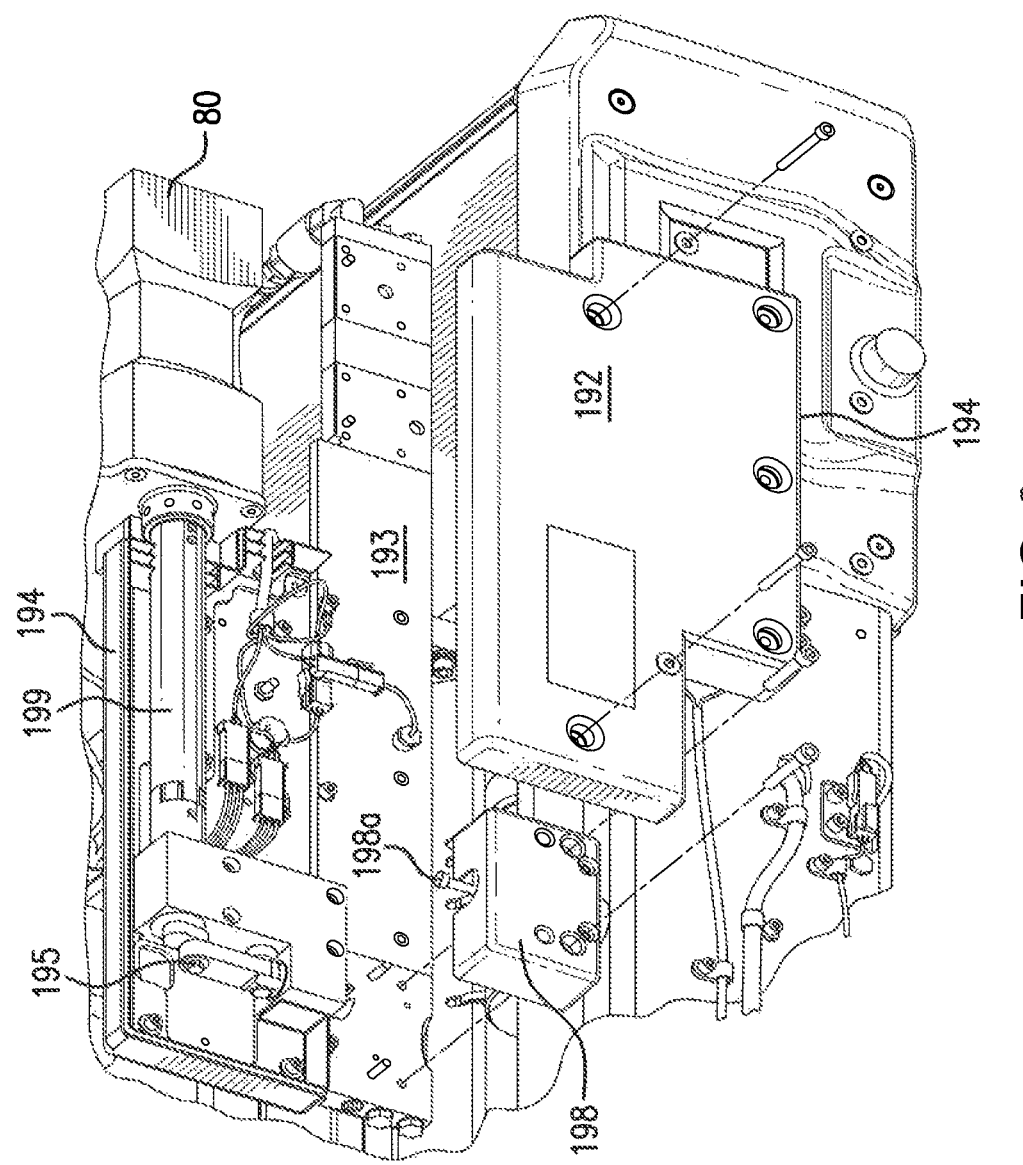
FIG. 9 illustrates a front perspective view of dispenser apparatus of the bag forming assembly.

Referring to FIG. 9, dispenser apparatus 192 includes a housing 194, motor 80b, and manifold 193. Dispenser apparatus 192 functions to dispense the foam precursor(s), such as chemicals A and B, between plies of a film web 216, and the plies are sealed together and cut to form a bag. In this manner, the dispenser apparatus 192 serves to form the foam-in-bag products as described herein. Shutoff valves 168a, 168b, for chemicals A and B, respectively, are shown in FIG. 7. A dispenser outlet preferably is also positioned above and centrally axially situated between first and second side frame structures 66, 68. With this positioning, dispensing of material (chemicals A and B) can be carried out in the clearance space defined axially between the two respective nip roller sets 74, 76 and 84, 86. Dispenser assembly 192 is preferably supported a short distance above (for example, a separation distance of about 1 to 5 inches and preferably about 2 to 3 inches) the nip contact location or the underlying (preferably horizontal) plane on which both rotation axes of shafts 72, 82 fall. This arrangement allows for receipt of chemical in the bag-being formed in direct fashion and with a lessening of spray or spillage due to a higher clearance relationship as in the prior art. Mixing module 198 mixes chemicals A and B prior to insertion into the web 216, and includes a valve stem 198a actuated by actuator 195, which itself is driven by shaft 199 and motor 80b. Solvent is delivered to the mixing module using solvent line 6a and manifold 6c (shown in FIG. 8). Manifold 6c is provided for a check valve that functions to produce sufficient back pressure in the solvent hose. The mixing module is secured by an attachment means 190 (shown in FIG. 8), which may include one or more screws and pins. The pins also serve to accurately position the mixing module 198 with respect to the actuator 195.

Figure 10:
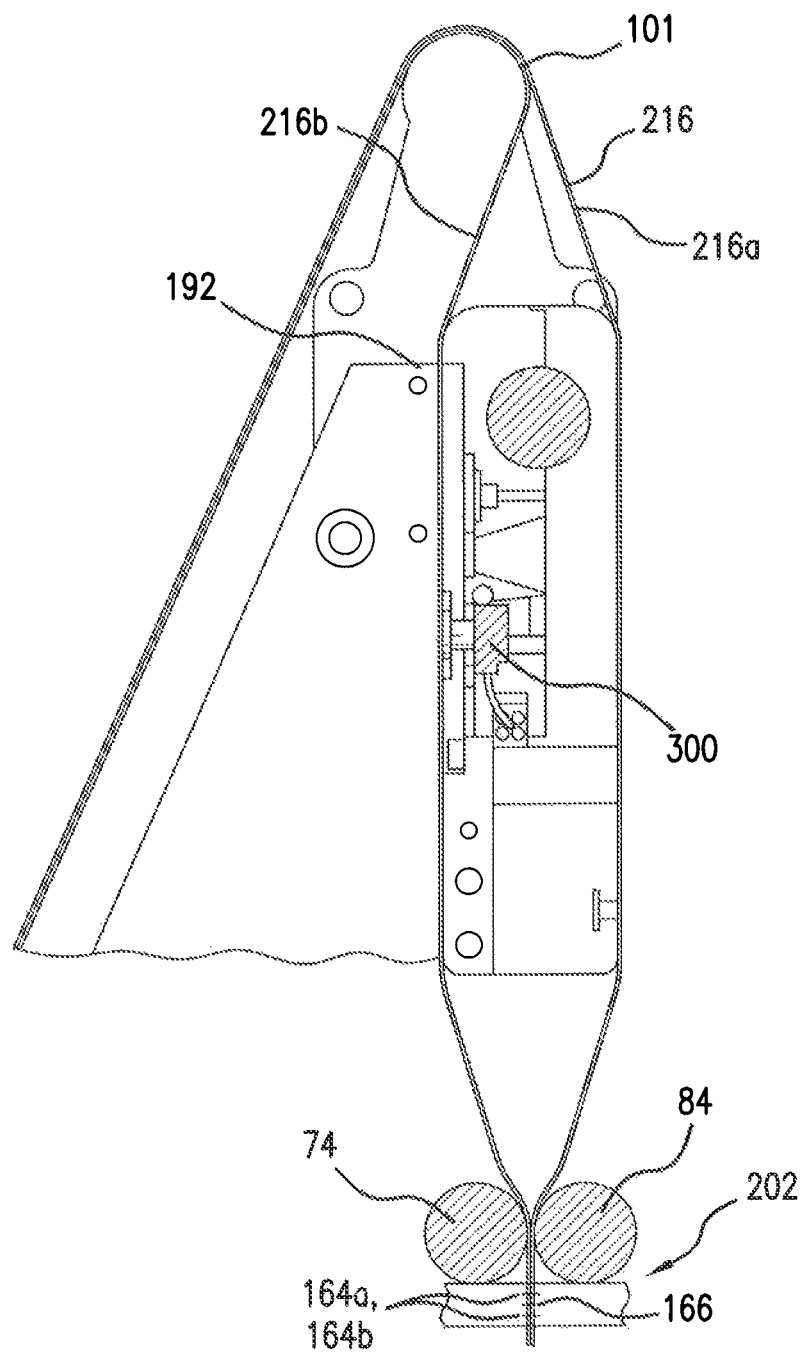
FIG. 10 illustrates a portion of a film travel path through the dispenser apparatus in accordance with the present disclosure.

FIGS. 8 and 10 provides a side elevational view of dispenser system 192 and jaw assembly 202, including jaws 116 and 116b, in relationship to film 216 which in a preferred embodiment is a C-fold film featuring a common fold edge and two free edges at the opposite end of the two fold panel. The jaw assembly is configured for driving 116b against 116 with sufficient force to pinch the two film plies to performs the sealing and cutting and to keep the precursors from leaking past the jaws before the sealing is complete. While a C-fold film is a preferred film choice, a variety of other film types of film or bag material sources are suitable for use of the present invention including gusseted and non-gusseted film, tubular film (preferably with an upstream slit formation means (not shown) for passage past the dispenser) or two separate or independent film sources (in which case an opposite film roll and film path is added together with an added side edge sealer) or a single film roll comprised of two layers with opposite free edges in a stacked and rolled relationship (also requiring a two side edge seal not needed with the preferred C-fold film usage wherein only the non-fold film edging needs to be edge sealed). For example, in a preferred embodiment, in addition to the single fold C-fold film, with planar front and back surfaces, a larger volume bag is provided with the same left to right edge film travel width (for example, 12 inch or 19 inch) and features a gusseted film such as one having a common fold edge and a V-fold provided at that fold end and on the other, interior side, free edges for both the front and rear film sheets sharing the common fold line. The interior edges each have a V-fold that is preferably less than a third of the overall width of the sheet.

As further shown in FIG. 10 after leaving the film roll and traveling past the lower idler roller, the film is wrapped around upper idler roller 101 and exits at a position where it is shown to have a vertical film departure tangent vertically aligned with the nip contact edge of the nip roller sets. Because of the C-fold arrangement, the folded edge is free to travel outward of the cantilever supported dispenser system 192. That is, depending upon film width desired, the folded end of C-fold film 216 travels vertically down to the left side of dispenser end section 196 for driving nip engagement with the contacting, left set of nip rollers. The opposite end of film 216 with free edges travels along the smooth surface of dispenser housing whereupon the free edges are brought together for driving engagement relative to contacting right nip roller set (76, 84) for the bag being formed.

Figure 11:
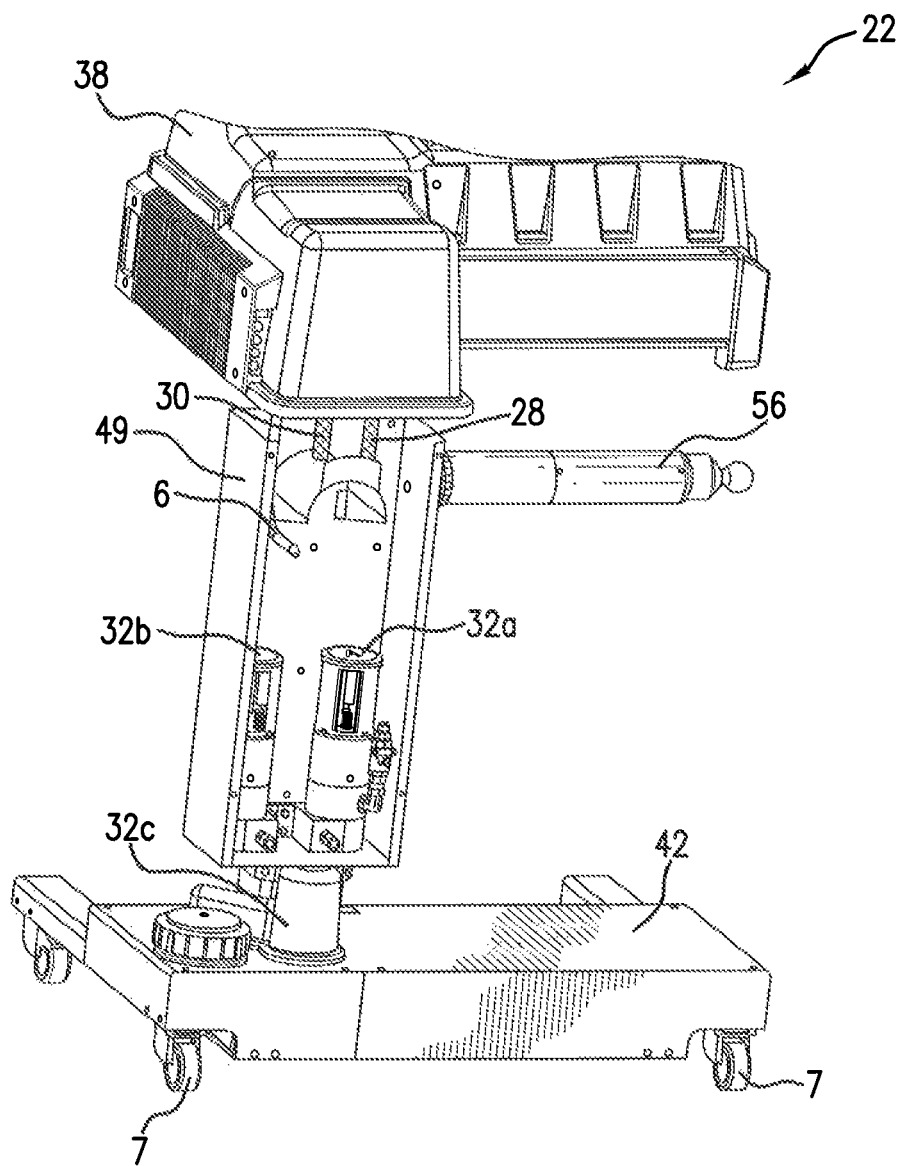
FIG. 11 illustrates a view of an inline pump assembly and hose manager in accordance with the present disclosure.

Referring to FIG. 11, an inline pump assembly can be used that includes a pump 32a for the feed line of chemical A 28, and a pump 32b for the feed line of chemical B 30. As shown, inline pumps 32a, 32b can, in some embodiments, be housed within and mounted to a hose manager 49, which helps the telescoping column 48 to operate without interfering with the chemical lines 28, 30, and solvent line 6. The hose manager 49 can be mounted to the head of the device or to the upper telescoping portion to move with the head as it is raised or lowered, or alternatively can be mounted to the base of the device or another suitable location.

In operation, a film web 216 is fed to the apparatus 22. Cut/seal jaw 116 and complementary jaw 116b close to hold the film in place as cutting and sealing occurs. Venting holes are cut by vent cutter 162, and chemicals A and B are dispensed between the plies of the film. The jaw 116b is moved to opened, and the film 216 advances by operation of motor 80a and the nip rollers. The filled bag may be removed prior to or after opening of the jaw.

Some additional examples of these foam-in-bag fabrication devices can be seen in U.S. Pat. Nos. 5,376,219; 4,854,109; 4,938,007; 5,139,151; 5,575,435; 5,679,208; and 5,727,370. A further example of a foam-in-bag device is shown in U.S. Pat. No. 7,735,685, the contents of which are herein incorporated by reference in their entirety. Furthermore, an example of a vent cutting device is disclosed in U.S. Pat. No. 7,367,171, the contents of which are herein incorporated by reference in their entirety. The disclosure herein can, in the alternative, be used with any of the foam-in-bag systems discussed above.

Figure 12:
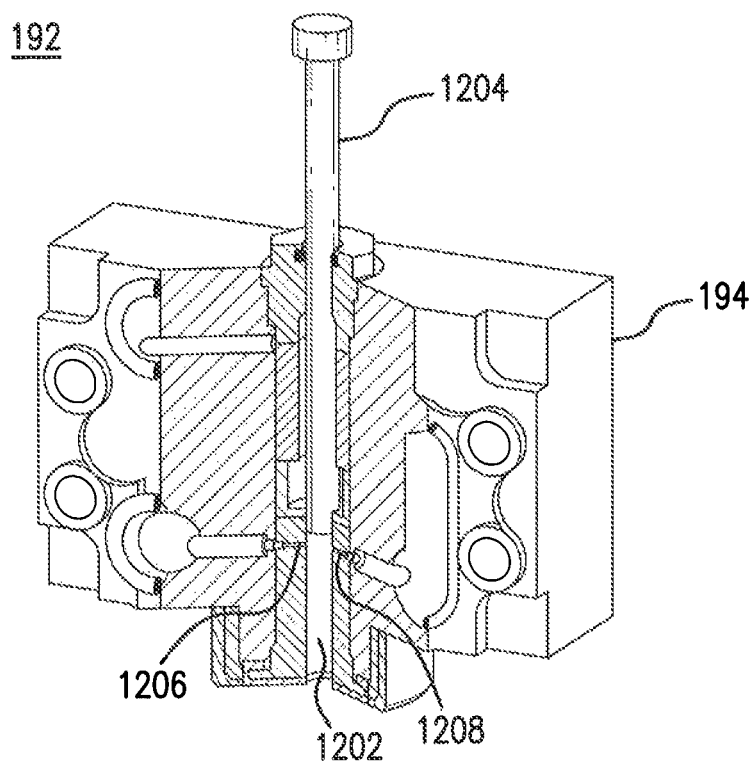
FIGS. 12 and 13 illustrate a cut-away perspective views of a portion of a dispenser assembly in accordance with an exemplary embodiment of the present disclosure.

FIG. 12 shows a cut-away perspective view of a portion of dispenser assembly 192 in accordance with certain exemplary embodiments of the present disclosure. As shown in FIG. 12, dispenser assembly 192 can include dispenser housing 194 and a mixing chamber 1202. A valve 1204 is preferably used to open and close inlet ports 1206 and 1208 to the mixing chamber 1202, and in the embodiment shown, a valving rod 1204 is used. Inlet ports 1206 and 1208 are in fluid communication with mixing chamber 1202, and can supply foam precursor chemicals contained in chemical supply containers 24 and 26 to the mixing chamber 1202. For example, inlet port 1206 can supply chemical A held in chemical supply container 24 to mixing chamber 1202 and inlet port 1208 can supply chemical B held in chemical supply container 26 to mixing chamber 1202.

Figure 13:
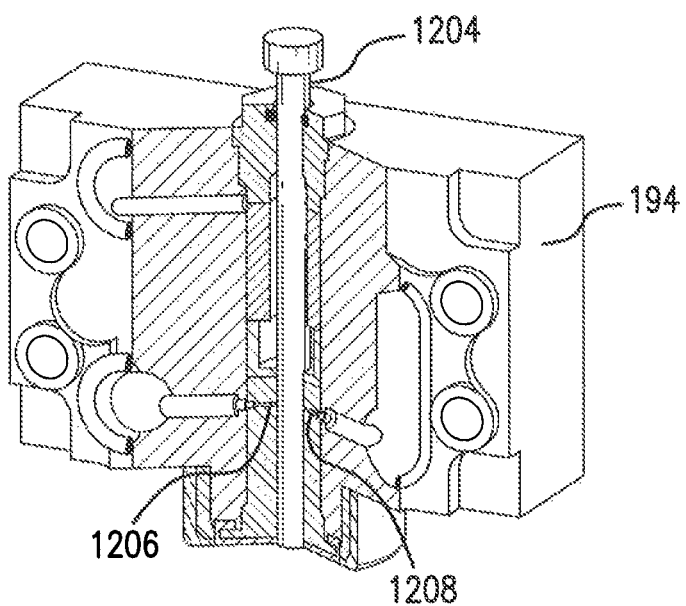

Additionally, valving rod 1204 can be actuated between open and closed positions. Through the travel of valving rod 1204, any position of valving rod 1204 where inlet ports 1206 and 1208 are open such that the chemicals can flow can be referred to as an open condition, and any position of valving rod 1204 where inlet ports 1206 and 1208 are blocked by valving rod 1204 such that the chemicals cannot flow can be referred to as a closed condition. In FIG. 12, valving rod 1204 is shown in an open position (e.g., disposed such that it is not blocking inlet ports 1206 and 1208). In the open position (and in any open condition), inlet ports 1206 and 1208 are open and in fluid communication with mixing chamber 1202, allowing the chemicals to flow through inlet ports 1206 and 1208 into mixing chamber 1202. FIG. 13 shows valving rod 1204 in a closed position. In the closed position (and in any closed condition), valving rod 1204 is blocking inlet ports 1206 and 1208, thereby preventing the flow of chemicals through inlet ports 1206 and 1208 into mixing chamber 1202.

Figure 14:
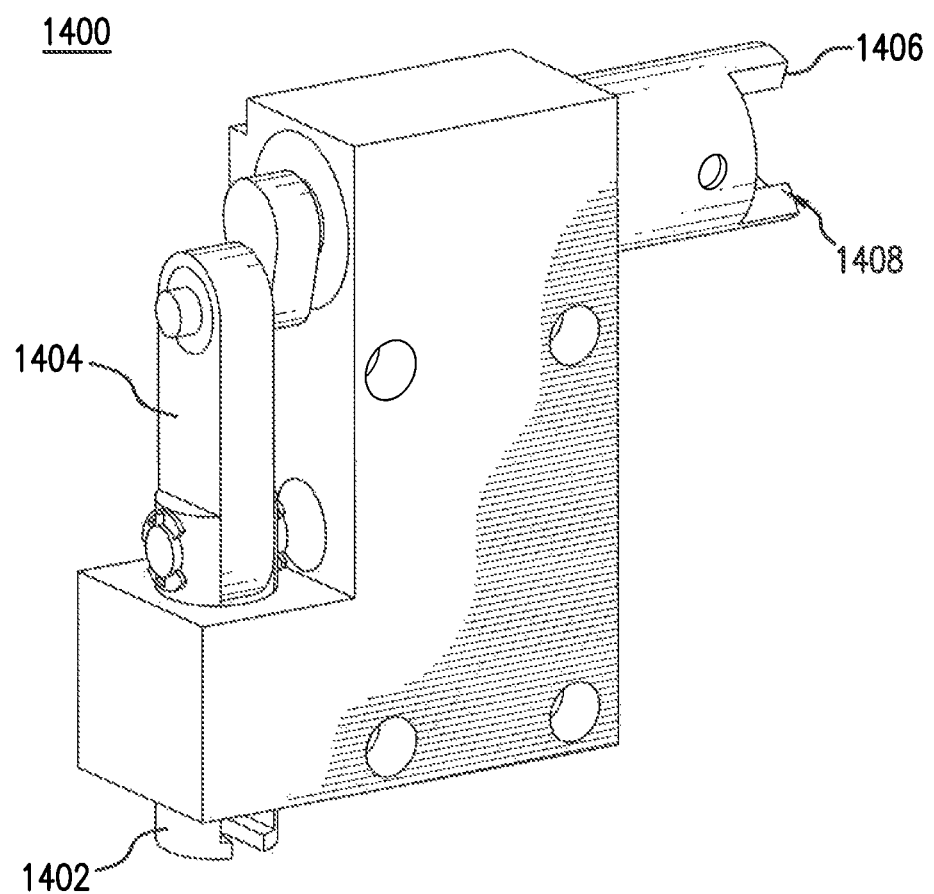
FIG. 14 illustrates a valve actuation assembly in accordance with an exemplary embodiment of the present disclosure.

The actuation of valving rod 1204 between open and closed positions can be performed valve actuation assembly 1400, as shown in FIG. 14. Valve actuation assembly 1400 can include a crank mechanism 1402 configured to actuate valving rod 1204 between open and closed positions. As shown in FIG. 14, valve actuation assembly 1400 can include a coupling element 1402 configured to engage an end of valving rod 1204. Coupling element 1402 can be pivotally associated with a member rod 1404, which can in turn be coupled to crank mechanism 1406.

FIG. 14 shows valve actuation assembly 1400 in a fully closed position. In this position, valve actuation assembly 1400 positions valving rod 1204 in a closed condition preventing the flow of chemicals through inlet ports 1206 and 1208 into mixing chamber 1202. Operation of valve actuation assembly 1400 will be described with respect to the position shown in FIG. 14. For example, turning crank mechanism 1406 from the position shown in FIG. 14 will raise member rod 1404, which in turn will pivotally raise coupling element 1402. Crank mechanism 1406 can be rotated by dispenser motor 80. This action will raise valving rod 1204, thereby actuating valving rod 1204 from the closed position to the open position. In an exemplary embodiment, a 180° rotation of crank mechanism 1402 can fully actuate valving rod 1204 between a fully closed position and a fully open position. Additionally, crank mechanism 1402 can include sensors, such as magnetic Hall sensors 1408, to enable valve actuation assembly to determine the position of valving rod 1204 (e.g., open or closed). Alternative embodiments can employ other suitable types of valves and other suitable valve actuation mechanisms.

Figure 15:
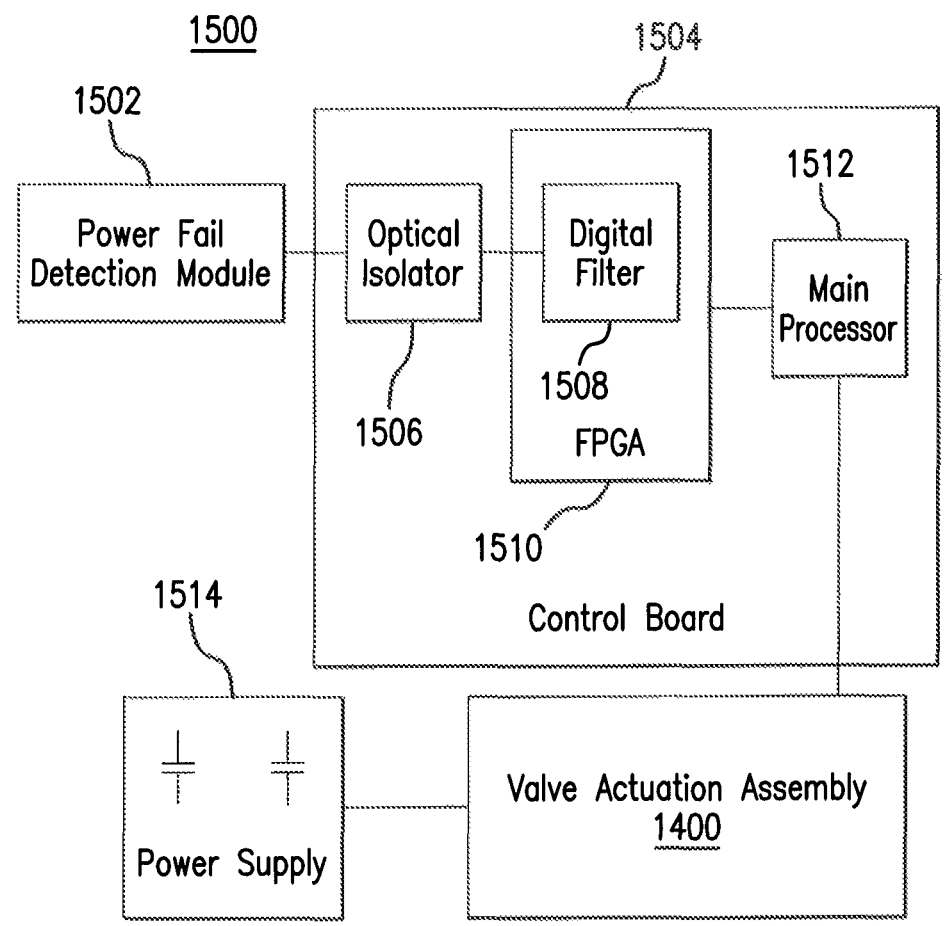
FIG. 15 illustrates an exemplary block diagram of an exemplary power-loss protection mechanism in accordance with an exemplary embodiment of the present disclosure.

Certain exemplary embodiments of the present disclosure can also include a power-loss protection arrangement or mechanism 1500. FIG. 15 shows an exemplary block diagram of an exemplary power-loss protection mechanism 1500. Power-loss protection mechanism can be implemented, for example, as a combination of both hardware and software. The power-loss protection mechanism 1500 can be configured to close valving rod 1204 sufficiently to prevent the flow of the chemicals out of inlet ports 1206 and 1208 in the event of a power loss.

As shown in FIG. 15, power-loss protection mechanism 1500 can include a power-loss detection module 1502, a control board 1504, a valve actuation assembly 1400 and a power supply 1514 (e.g., a first power supply or an auxiliary power supply). Power-loss detection module 1502 can be configured to detect a power failure or loss of incoming power, and transmit a power fail signal. For example, power-loss detection module 1502 can include a monitoring circuit configured to monitor the incoming power. In the event that a power loss or failure is detected, power-loss detection module 1502 can transmit a power fail signal to a control board 1504 of the dispensing system 20. The power fail signal can first be transmitted to an optical isolator 1506 to provide an initial filtering of the power fail signal. Subsequently, the power fail signal can pass through a digital filter 1508 that can introduce a time delay to the power fail signal. Digital filter 1508 can be programmed into a field programmable gate array (FPGA) 1510 located on control board 1504. This filter can ensure that the power signal is an indication of a legitimate power failure by, e.g., filtering out noise, etc. After the filtering, assuming that the filter's time delay is satisfied, FPGA 1510 can send a signal to a main system processor 1512. For example, the signal transmitted by FPGA 1510 can be sent to a high-speed interrupt pin on the main system processor 1512. When the main system processor 1512 detects the signal from FPGA 1510 on the high-speed interrupt pin, the main system processor 1512 can poll valve actuation assembly 1400 to ascertain the position of valving rod 1204. The power failure detection, the filtering and processing of the signal, as well as ascertaining the position of valving rod 1204 preferably takes less than a few microsecond (e.g., less than 4 microseconds, less than 2 microseconds, or less than 1 microsecond). Further, sufficient residual power can remain in the power supply (e.g., in capacitors) that powers the control circuits to allow the control circuits to process these steps.

Figure 16:
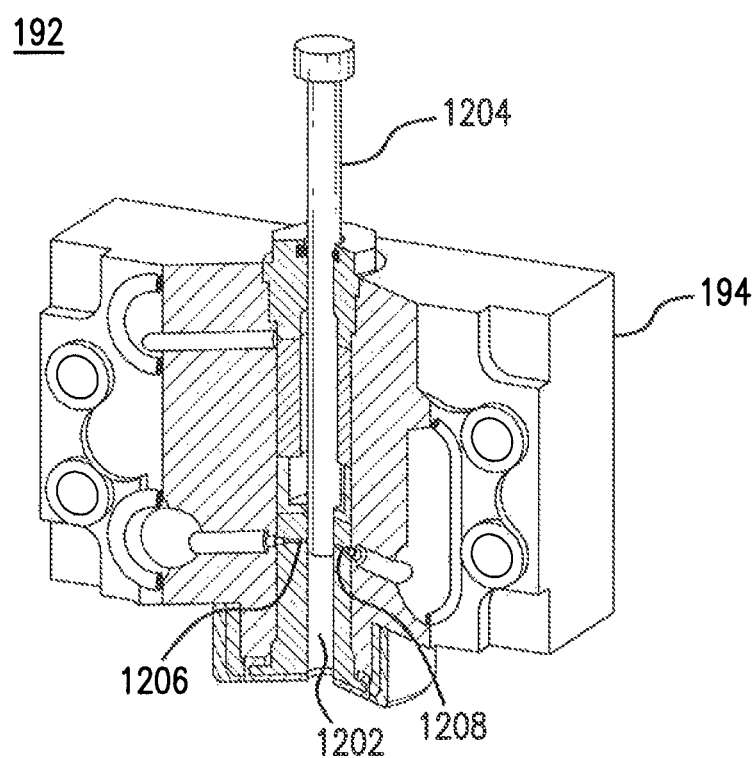
FIG. 16 illustrates a cut-away perspective views of a portion of a dispenser assembly in accordance with an exemplary embodiment of the present disclosure.

If valving rod 1204 is in the open position, main system processor 1512 transmits a command to direct power to dispenser motor 80 to drive valve actuation assembly 1400 to actuate valving rod 1204 from the open position to a closed position. The power supplied to dispenser motor 80 is preferably residual power stored in the power supply that powers dispenser motor 80. Alternatively, power can be supplied using an auxiliary power supply (e.g., a battery or generator back-up). In an exemplary embodiment, the power supply will have sufficient residual power to power dispenser motor 80 for about, e.g., 10 milliseconds. This may be sufficient to rotate crank mechanism 1402 approximately 90°. Although this may not actuate valving rod 1204 to a fully closed position, valving rod 1204 is sufficiently actuated to a closed condition such that inlet ports 1206 and 1208 are closed by valving rod 1204 to prevent the flow of chemicals. FIG. 16 shows valving rod 1204 in an exemplary "partially" closed position (e.g., a closed condition) after activation of the power-loss protection mechanism 1500. As shown in FIG. 16, although valving rod 1204 is not in a fully closed position, it is positioned such that inlet ports 1206 and 1208 are closed by valving rod 1204 to prevent the flow of chemicals. In some embodiments, sufficient power remains for performing the steps to move the valve to the closed condition for less than about 10 seconds, preferably less than 5 seconds, and more preferably less than 1 second. In some embodiments, the remaining power is sufficient to last for less than 0.5 seconds, 0.1 seconds, 0.01 seconds, or less than 0.005 seconds. Preferably, however, insufficient power remains to continue the normal operation of the foam-in-bag device, or to complete the filling, sealing, and/or cutting of the bags.

Figure 17:
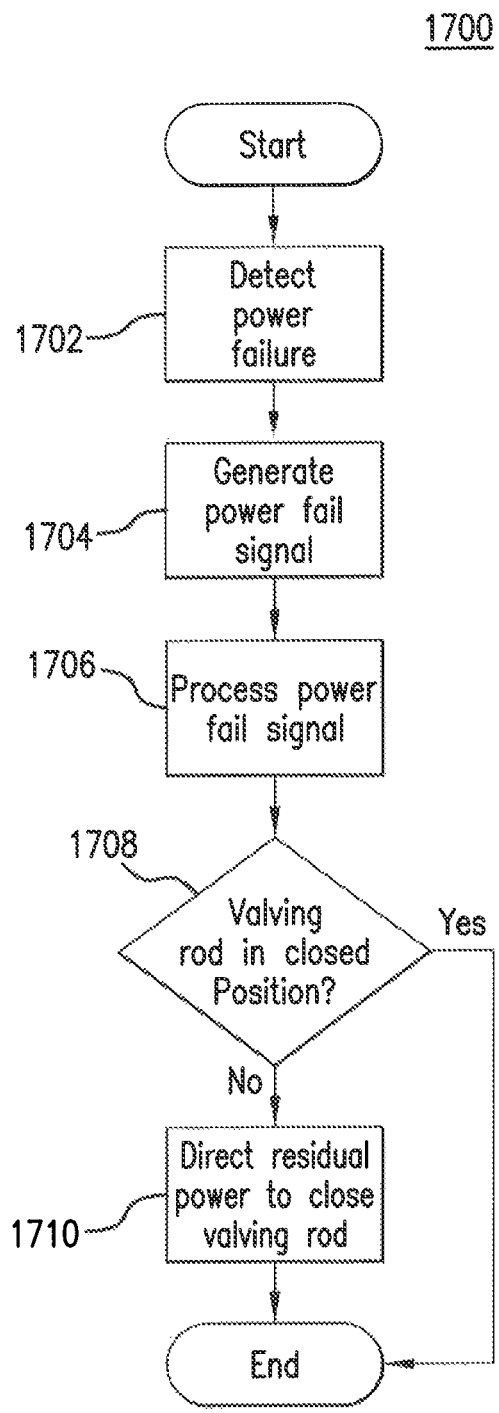
FIG. 17 illustrates an exemplary flow of an exemplary power-loss protection method in accordance with an exemplary embodiment of the present disclosure.

FIG. 17 shows an exemplary flow 1700 in accordance with an exemplary embodiment of the present disclosure. In block 1702, a power failure is detected. Next, a power fail signal is generated in 1704 and processed during step 1706. The processing of the power fail signal can include introducing delays, filtering, etc. Subsequently, the position of the valving rod is determined in step 1708. If the valving rod is in the closed position, no further action is taken. However, if the valving rod is in the open position, residual power is directed to the dispensing motor to actuate the valving rod towards the closed position (1710). As discussed above, the valving rod is actuated sufficiently so that the inlet ports of the mixing module are closed by the valving rod to prevent the flow of chemicals. It will be understood that alternative arrangements and systems can be employed to close the valve to prevent continued escape of foam precursors in the event of a power failure or device shut off.

All of the references specifically identified in the detailed description section of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. A foam-in-bag device powered by an incoming power supply, comprising:
   a dispenser unit configured for dispensing a foam-precursor into a web of film material for making foam-in-bag packaging material;
   a fluid supply conduit connected to the dispenser unit for delivering the foam-precursor to the dispenser unit;
   a valve that is normally powered by incoming power from the incoming power supply and is connected to the dispenser outlet and actuatable between:
      an open condition allowing flow of the foam-precursor so as to permit the dispensing of the foam precursor, and
      a closed condition preventing flow of the-foam precursor so as to prevent the dispensing of the foam precursor; and
   a power-loss protection mechanism configured to direct remaining power from the incoming power supply to actuate the valve to the closed condition upon detecting a loss of the incoming power and terminate foam-in-bag production of the foam-in-bag device.

2. The device of claim 1, wherein the power-loss protection mechanism is connected for detecting the loss of incoming power and directing the remaining power to the valve when the loss of incoming power is detected.

3. The device of claim 1, wherein the remaining power is supplied by the incoming power supply.

4. The device of claim 3, wherein the remaining power includes residual power from the first power supply after the loss of incoming power.

5. The device of claim 4, wherein the incoming power supply includes at least one capacitor and the residual power includes power stored on the capacitor.

6. The device of claim 1, wherein the power-loss protection mechanism is configured to direct the remaining power to actuate the valve to the closed condition for less than about 10 seconds.

7. The device of claim 1, wherein the power-loss protection mechanism includes:
 a power-loss detection arrangement configured to detect the loss of incoming power and generate a power failure signal; and
 a power-loss processing arrangement configured to process the power failure signal.

8. The device of claim 7, wherein the power-loss processing arrangement includes
 a field programmable gate array; and
 an optical isolator for processing the power failure signal.

9. The device of claim 1, further comprising a valve actuation arrangement operably associated with the valve for actuating the valve between the open and closed conditions, the valve actuation arrangement including a sensor configured to detect a position of the valve for controlling the actuation for closing the valve when the loss of incoming power is detected.

10. The device of claim 9, wherein the actuation arrangement comprises a motor.

11. The device of claim 1, wherein the foam precursor includes first and second foam precursors selected for reacting together to produce a foam that expands and solidifies for the foam-in-bag protective packaging, and wherein the dispenser unit comprises a mixing module configured for mixing and dispensing the foam precursors.

12. The device of claim 11, wherein the valve in the closed condition prevents the flow of the first and second foam precursors from the dispenser unit.

13. The device of claim 1, wherein the valve comprises a valving rod.

14. The foam-in-bag device of claim 1, further comprising:
 a valve actuation assembly comprising:
  a motor normally powered by the incoming power supply and operably connected to the valve, wherein the motor moves the valve between the open condition and the closed condition; and
  a valve sensor that detects a position of the valve.

15. The foam-in-bag device of claim 14, wherein the power-loss protection mechanism further comprises:
 a processor in electrical communication with the valve actuation assembly; and
 a monitoring module in communication with the processor and the incoming power supply; wherein
 the monitoring module monitors the incoming power supply and transmits a power fail signal to the processor upon detecting the loss of incoming power;
 the processor receives the position of the valve from the valve sensor; and
 if the valve is in the open condition, the processor provides remaining power from the incoming power supply to the motor to actuate the valve to the closed condition.

16. The foam-in-bag device of claim 15, wherein the power-loss protection mechanism further comprises a filter in electrical communication with the monitoring module and the processor, wherein the filter receives the power fail signal from the monitoring module and filters the power fail signal prior to transmitting the power fail signal to the processor.

17. The foam-in-bag device of claim 16, wherein the filter comprises:
 an optical isolator filter that provides initial filtering for the power fail signal; and
 a digital filter that introduces a time delay into the power fail signal.

18. A method for preventing dispensing of a foam precursor in a foam-in-bag device, comprising:
 detecting a loss of incoming power from a main power supply; and
 directing auxiliary power to actuate a valve to a closed condition when the loss of incoming power is detected to prevent the dispensing of the foam precursor and terminate foam-in-bag production of the foam-in-bag device.

19. The method of claim 18, wherein the auxiliary power includes residual power from the main power supply after the loss of incoming power.

20. The method of claim 19, wherein the residual power is stored on a capacitor.

21. The method of claim 18, wherein the auxiliary power is supplied from an auxiliary power supply to actuate the valve to the closed condition.

22. The method of claim 18, further comprising:
 generating a power failure signal when the loss of incoming power is detected; and
 processing the power failure signal to effectuate direction of the auxiliary power to actuate the valve.

23. The method of claim 22, wherein the processing is at least partially performed by a field programmable gate array.

24. The method of claim 22, further comprising detecting a position of the valve prior to directing the auxiliary power to actuate the valve.

25. The foam-in-bag device of claim 1 including a main power supply circuit in electrical communication with the incoming power supply, wherein the main power supply circuit stores the remaining power from the incoming power supply to actuate the valve.

26. The method of claim 18, wherein the closed condition of the valve is a position between a fully open position and a fully closed position.

* * * * *